July 24, 1962 E. C. WESTERFIELD 3,046,545

RAPID-CORRELATION ECHO-RANGING SYSTEM

Filed Oct. 28, 1959 2 Sheets-Sheet 1

INVENTOR.
EVERETT C. WESTERFIELD

BY

ATTORNEYS

INVENTOR.
EVERETT C. WESTERFIELD
BY
ATTORNEYS

United States Patent Office 3,046,545

Patented July 24, 1962

3,046,545
RAPID-CORRELATION ECHO-RANGING SYSTEM

Everett C. Westerfield, San Diego, Calif., assignor to the United States of America as represented by the Secretary of the Navy Filed Oct. 28, 1959, Ser. No. 849,417
3 Claims. (Cl. 343—5)
(Granted under Title 35, U.S. Code (1952), sec. 266)

The invention described herein may be manufactured and used by or for the Government of the United States of America for governmental purposes without the payment of any royalties thereon or therefor.

This invention relates to a rapid-correlation echo-ranging system and more particularly to a rapid-correlation echo-ranging system utilizing an automatic signal-time-compressor after reception and prior to correlation.

In one prior art correlation-type echo-ranging system, a signal, either continuous or discrete, is sent out and a suitably delayed replica of the signal is correlated with the returning echo. Peak correlation is obtained when the delay time for the replica is equal to the combined travel time for the signal out and the echo back. To detect echoes from various distances, i.e., echoes with various travel times, corresponding variations in the replica delay times are required. Since long averaging times are needed for high signal to noise gain, the rate of variation of the delayed time is limited, and in order to increase the target search rate, additional correlators with different replica delay times must be employed. The chief disadvantage of these prior art systems is the multiplicity of correlators required for an adequate search rate without loss of signal to noise gain. Other prior art correlation systems involve the use of two or more of the signal time compressors mentioned under prior art in my copending application Automatic Signal Time Compressor, Serial No. 849,418, filed October 28, 1959 and suffer from the disadvantages there noted.

According to the invention, two basically identical recycling binary code generators are utilized to modulate the outgoing signal and to correlate with the incoming signal, respectively. The first binary code generator is operated at a predetermined rate by a pulse generator. The output of this first code generator is passed through a code recognizer which produces an output pulse each time the binary code generator recycles. This pulse is utilized to operate or pulse the second binary code generator, the output of which modulates the transmitter of an echo ranging system. The received signal pulses are processed in the echo-ranging receiving system and passed through a sampling gate. The sampling gate is gated by the output of the code recognizer which places it in step with the binary code generator which is modulating the transmitter. The output of the sampling gate is then passed into a shift register system identical to that of my copending application, Serial No. 849,418, filed October 28, 1959. This shift register is designed to store one less than the exact number of binary digits in one cycle of the binary code generated by the binary code generators, and is shifted by the same pulse generator utilized to pulse the first binary code generator, which causes the shift register output to be compressed to equal the period of the first binary code generator. The outputs of the shift register and the first binary code generator are then passed through a digital correlator. The output of the digital correlator will, of course, be maximum when the two signals are in phase and in step. Since the output of the shift register and the first binary code generator run through an entire cycle, each time binary code generator No. 2 is stepped one time, the correlation will be automatic at a time corresponding to the range, utilizing only one correlator. A further advantage realized by the present invention over the prior art is the automatic time compression of both the replica and the received signal.

It is thus an object of the present invention to provide a rapid-correlation echo-ranging system in which only one correlator is necessary.

Another object is to provide a rapid-correlation echo-ranging system in which both the stored replica and the received signal are automatically time compressed.

A further object of the invention is the provision of a rapid-correlation echo-ranging system which utilizes a recycling modulation with random noise properties.

Still another object is to provide a rapid-correlation echo-ranging system in which the modulation code and code rate can be varied without duplicating any of the components.

Other objects and many of the attendant advantages of the invention will be readily appreciated as the same becomes better understood by reference to the following detailed description when considered in connection with the accompanying drawings in which like reference numerals designate like parts throughout the figures thereof and wherein.

Figure 1:
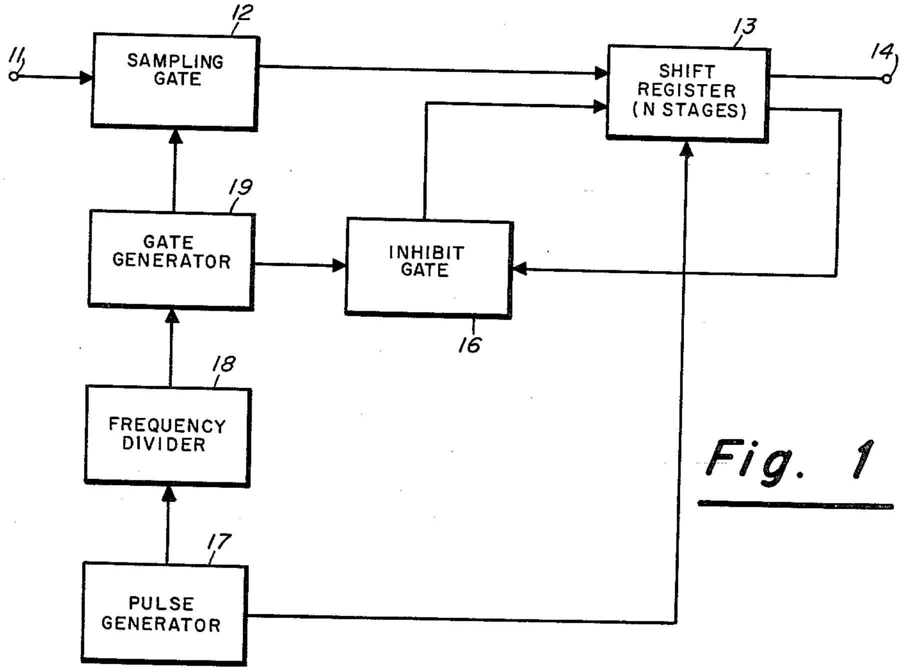
FIG. 1 shows a block diagram of an automatic signal time compressor.

Referring to FIG. 1, input terminals 11 are connected to the input of sampling gate 12, the output of which is applied to shift register 13. The output of shift register 13 is applied to output terminal 14 and an input of inhibit gate 16, the output of which is coupled to the input of shift register 13. Pulse generator 17 is coupled to shift register 13 and frequency divider 18. The output of frequency divider 18 is coupled to gate generator 19, the outputs of which are coupled to sampling gate 12 and inhibit gate 16.

Figure 2:
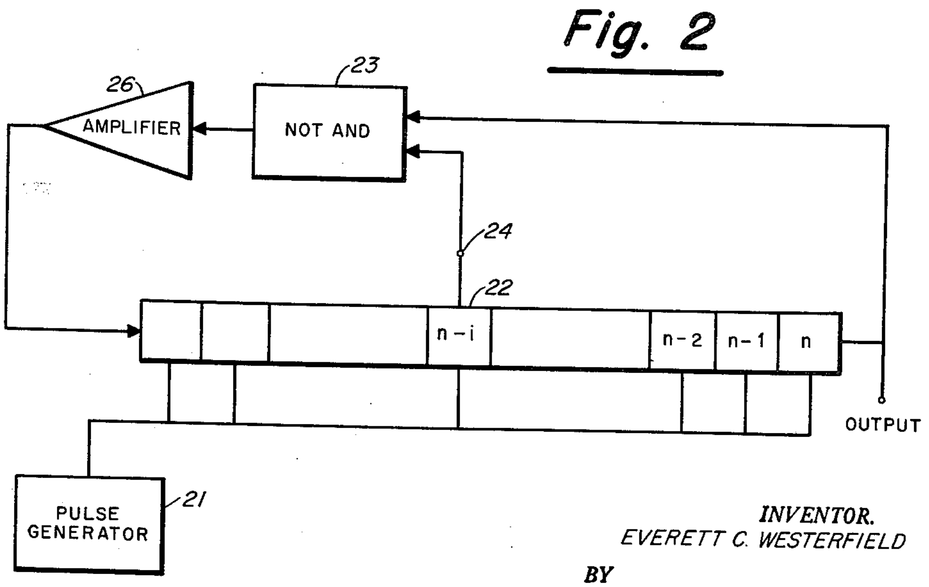
FIG. 2 shows a block diagram of a recycling binary code generator.

Referring now to FIG. 2, oscillator pulse generator 21 drives shift register 22. The output of shift register 22 is fed back to a Not-And circuit 23. Also fed to the input of Not-And circuit 23 is an output taken at terminal 24. The output of Not-And circuit 23 is coupled to amplifier 26 and back to the input of the first stage of shift register 22.

Figure 3:
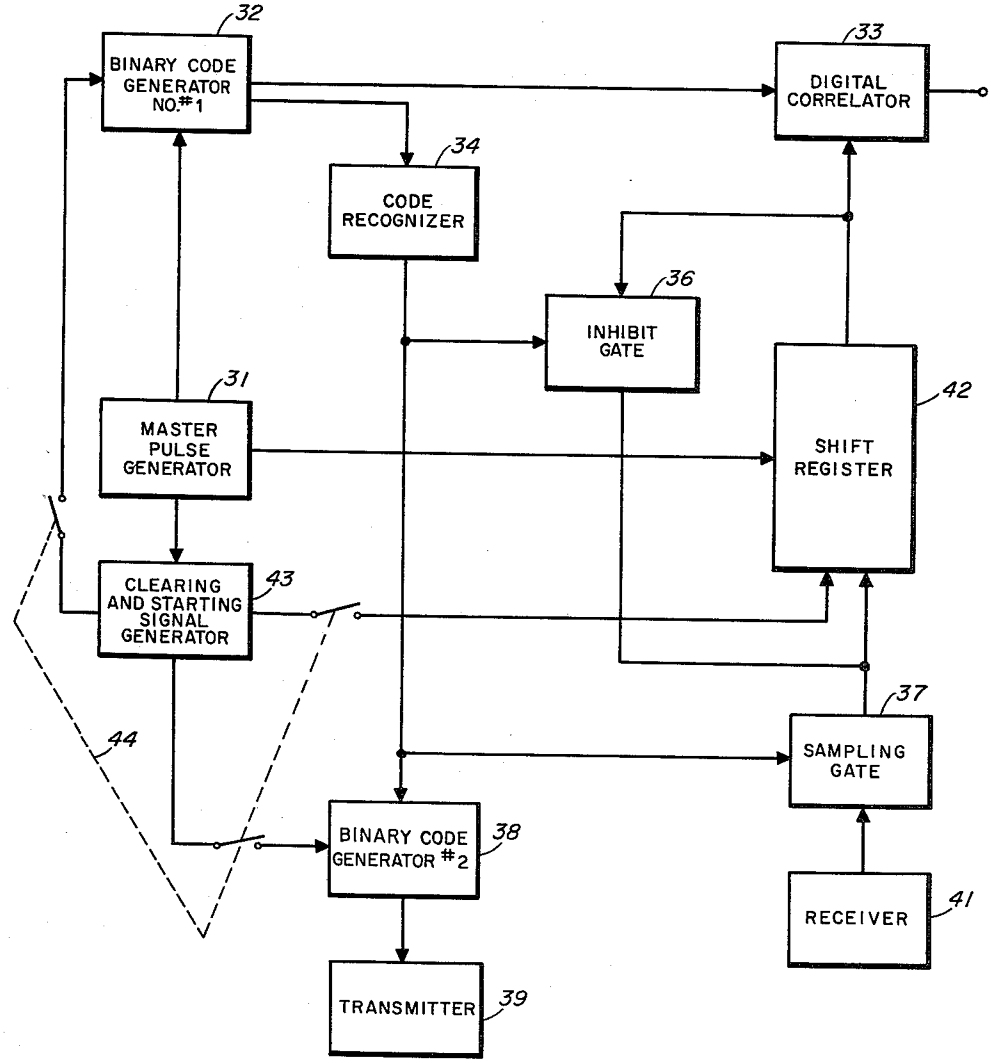
FIG. 3 shows a block diagram of a preferred embodiment of the present invention.

Referring now to FIG. 3, master pulse generator 31 is connected to binary code generator 32, the output of which is coupled to digital correlator 33 and code recognizer 34. The output of code recognizer 34 is connected to inhibit gate 36, sampling gate 37 and binary code generator 38. The output of binary code generator 38 is coupled to transmitter 39. Receiver 41 is connected to sampling gate 37, the output of which is connected to shift register 42. The output of shift register 42 is connected to digital correlator 33 and inhibit gate 36, the output of which is connected back to the input of shift register 42. Master pulse generator 31 is also connected to shift register 42 and clearing and starting generator 43. The output of clearing and starting generator 43 is coupled through switch 44 to binary code generator 32, binary code generator 38, and shift register 42.

OPERATION

Referring now to FIG. 1 in detail, there is shown the preferred embodiment of an automatic signal time compressor as disclosed in my copending application, Serial No. 849,418, filed October 28, 1959. Since this does not form the inventive concept per se in the present invention, a brief description only will ensue. The input signal is applied to input terminal 11, which is connected to an input of sampling gate 12, sampling gate 12 is gated by gate generator 19 at a rate at least high enough to obtain the necessary intelligence from the signal presented at the input terminal 11. The master pulse generator 17 is divided in frequency divider 18 which then drives gate generator 19 to produce the sampling gate pulse. As explained in my copending application, Serial No. 849,418, filed October 28, 1959, in the most common mode, i.e., the $N+1$ mode, pulse generator 17 is operated at the rate $R(N+1)$ where N is the number of stages in shift register 13. This is divided by a factor of $N+1$ to yield a gate pulse rate R. The shift register is thus shifted by an output of pulse generator 17 at a rate $N+1$ times the sampling rate of sampling gate 12. The output of shift register 13 is coupled through inhibit gate 16 back to the input of shift register 13. The first signal sample will then be $N+1$ stages ahead of the second signal sample as it enters the shift register. Since there are N stages in the shift register, this places the signals in the original sequence. Inhibit gate 16 is closed by the pulse from gate pulse generator 19 at the same time the sampling gate 12 is gated on. This prevents ambiguity of signals at the input of shift register 13. It is thus seen that the output will consist of $N+1$ signal samples for each input sample, and in the original input order.

Referring now to FIG. 2, there is shown a recycling binary code generator. One system suitable for this purpose is described in IRE Proceedings, October 1958, pp. 1741–1744. In general, it consists of a shift register having N stages, the output of the Nth stage being sent back through Not-And circuit 23 to the input of the first stage of shift register 22 after amplification in amplifier 26. Pulse generator 21 is applied to each stage of the shift register and shifts the register at the rate of the frequency of the pulse generator. An intermediate output is taken at terminal 24 from the $(N-i)$th digit. This is also coupled through the Not-And circuit 23 back to the amplifier 26 to the input of the shift register. The Not-And circuit has the property that when one and only one of its two inputs is "one," the output is "one"; otherwise, the output is zero. Pulse generator 21 generates pulses at a steady rate. Each pulse will cause every digit in the shift register to shift to the right by one unit or stage. The amplified output of the Not-And circuit 23 will each time determine the new state of the first register stage. Thus, the next state of shift register 22 is completely determined by the existing state. For an N digit shift register, the maximum number of states is $2^n$. Since the condition of all zeros must be excluded, the maximum number of usable states becomes $2^n-1$. In practice, this maximum length series or cycle can be obtained for most values of N by proper choice of the tap position 24. For example, if N equals 25, maximum length recycling will occur in 33,554,431 bit time intervals. At a 10 kc. rate for pulse generator 21, this will give a cycling rate of once per 56 minutes. In the case of 25 stages, the maximum cycle length tap will be the 3rd or the 7th from the 25th tap, i.e., the 18th or 22nd tap.

Referring now to FIG. 3 of the drawing, it is first pointed out that master pulse generator 31, binary code generator 32, code recognizer 34, inhibit gate 36, sampling gate 37, and shift register 42 comprise the components of an automatic recycling signal time compressor as shown in FIG. 1. Master pulse generator 31, of course, is the equivalent of pulse generator 17; binary code generator 32 and code recognizer 34, the equivalent of frequency divider 18 and gate pulse generator 19; inhibit gate 36 the equivalent of inhibit gate 16; shift register 42, the equivalent of shift register 13, and sampling gate 37 the equivalent of sampling gate 12. All of these have the identical function as the corresponding parts of FIG. 1. As was pointed out with reference to FIG. 1, the shift register of FIG. 3 is operated in the $N+1$ mode. It is also pointed out that binary code generators 32 and 38 are of the recycling type as illustrated and explained with reference to FIG. 2. If the number of stages in the binary code generator shift registers is taken to be N in each case and the master pulse generator is taken at frequency $f$, the first binary code generator will recycle at a rate $$\frac{f}{2^n-1}$$

In the illustrated embodiment, code recognizer 34 will then produce a pulse for every $2^n-1$ pulses in the master pulse generator. This may be accomplished by feeding an output from each stage of binary code generator No. 1 into the code recognizer, the code recognizer being any one of the well known types such as an And circuit, which will produce an output when all of the input signals are "one." This, then, may be defined as the starting point and recycling point of the binary code generators. Shift register 42 will contain $(2^n-2)$ stages. This will be in keeping with the "$N+1$ mode," since if "N" in the original shift register of FIG. 1 is taken to be $(2^n-2)$, then "$N+1$" will be $(2^n-1)$, which is the divisor automatically supplied by code recognizer 34. Code recognizer 34 provides the shift pulses for binary code generator 38, the output of which in turn is used to modulate the output of transmitter 39. In one preferred embodiment transmitter 39 is a sonar transmitter which amplitude-modulates a single frequency carrier with the output of binary code generator 38. The returning signal echo is picked up by receiver 41, processed to return it to binary form, and applied to the input of sampling gate 37. Sampling gate 37 is then gated by the output of code recognizer 34 and applied to the input of shift register 42. The shift register is shifted at the rate $f$, which is the frequency of the master pulse generator and applied to digital correlator 33 along with the output of binary code generator 32. It can be seen at this point that if the input to the shift register is time compressed by a factor of $(2^n-1)$, the output of the shift register will then be at the bit rate $f$, since the original transmitted signal was modulated at the bit rate of $$\frac{f}{2^n-1}$$

which is the output of code recognizer 34. Since the binary code generators have an output with a random quality, the correlation at the output of the digital correlator for un-correlated signals will be in the order of the square root of the number of signal samples actually present in shift register 42. Obviously, when the correlation is perfect, the output of digital correlator 33 will be the arithmetical sum of the signal samples present in shift register 42, which can be integrated or averaged as desired.

Clearing and starting signal generator 43 can be synchronized with master pulse generator 31 to put out a series of "one" signals for example, as a starting point in all the shift registers of the system, i.e., the shift registers in binary code generators 32 and 38 and the shift register 42. This allows synchronous zero points to be present in the transmitter.

Obviously many modifications and variations of the present invention are possible in the light of the above teachings. It is therefore to be understood that within the scope of the appended claims the invention may be practiced otherwise than as specifically described.

What is claimed is:

1. A rapid-correlation echo-ranging system comprising; first and second recycling binary code generators, said binary code generators having a predetermined common starting state and a predetermined common cycle of repetition, clearing means for setting said binary code generators at said starting state, pulsing means for shifting said first binary code generator through said cycle of repetition, sensing means for sensing the starting condition of said first binary code generator, said sensing means operable to produce a gate pulse each time said first binary code generator passes through said starting state, a sampling gate having an input operably connected to the output of said sensing means, a feedback gate, said gate pulse from said sensing means operable to gate said sampling gate, to inhibit said feedback gate, and to shift said second binary code generator through a step of said cycle of repetition, an echo-ranging transmitter; said second binary code generator operably connected to said echo ranging transmitter for modulating said echo ranging transmitter; a receiver, said sampling gate having a signal input connected to the output of said receiver, said transmitter and receiver being complementary components of an integral echo-ranging system; a digital storage shift register capable of storing one bit less than one complete cycle of said binary code generator, the output of said sampling gate and the output of said feedback gate connected to the input of said digital storage shift register, said pulsing means connected for shifting said digital storage shift register, a comparison means; the output of said first binary code generator connected to a first input of said comparison means, the output of said digital storage shift register connected to a second input of said comparison means and to the input of said feedback gate, said comparison means operable to yield an output amplitude directly proportional to the time and phase correlation of its input signals.

2. The rapid-correlation echo-ranging system of claim 1 wherein each of said binary code generators comprises a digital shift register having N stages, operable to recycle after $(2^n-1)$ shift pulses, and said digital shift storage register contains $(2^n-2)$ stages.

3. The rapid-correlation echo-ranging system of claim 1 wherein said sensing means comprises a code recognizer.

References Cited in the file of this patent

UNITED STATES PATENTS

| | | |
|---|---|---|
| 2,768,372 | Green | Oct. 23, 1956 |

FOREIGN PATENTS

| | | |
|---|---|---|
| 724,555 | Great Britain | Feb. 23, 1955 |